Aug. 9, 1932. D. D. BRUSH 1,871,152
WINDSHIELD WIPER
Filed April 1, 1929
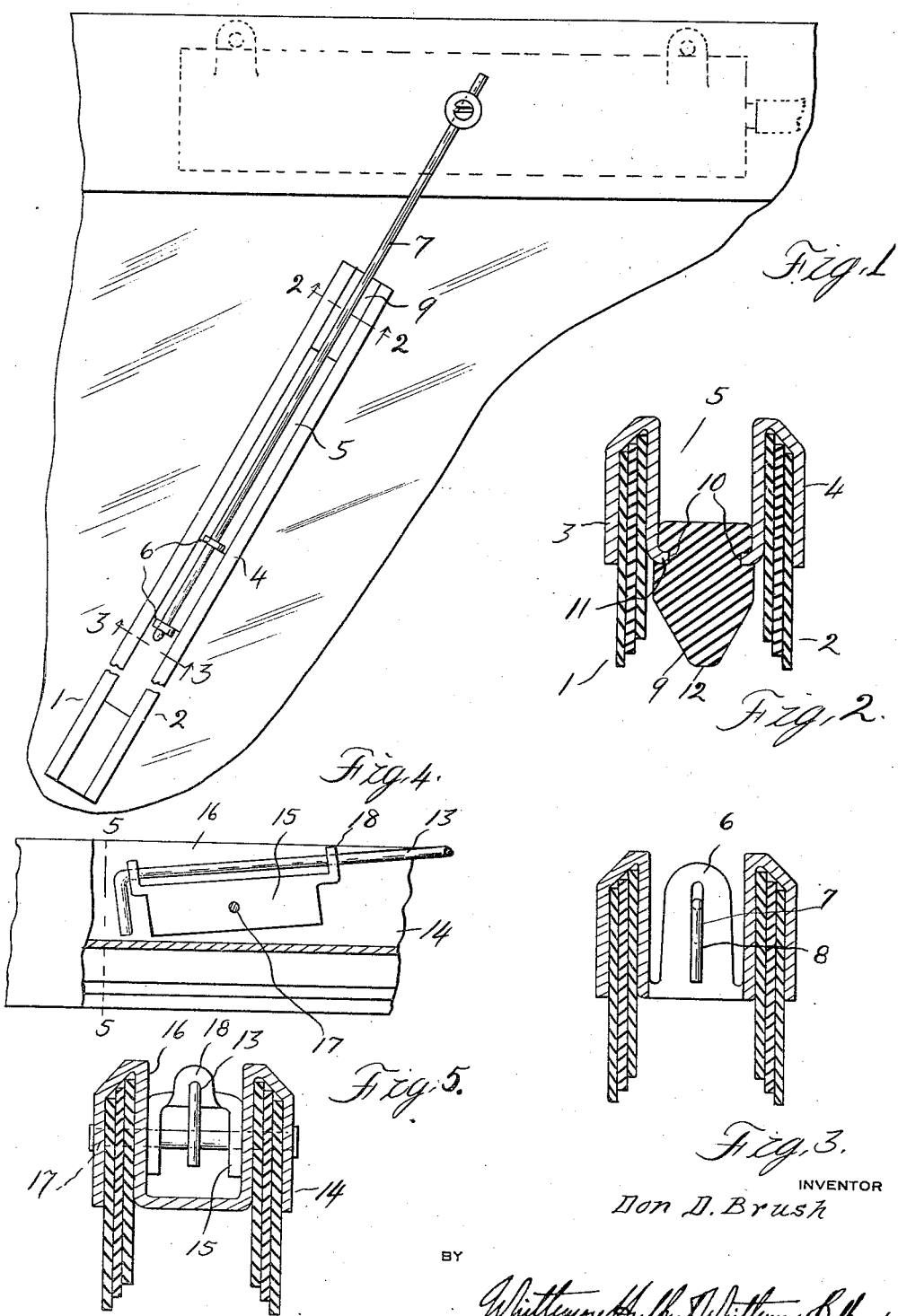
INVENTOR
Don D. Brush Patented Aug. 9, 1932

1,871,152

UNITED STATES PATENT OFFICE

DON D. BRUSH, OF DETROIT, MICHIGAN

WINDSHIELD WIPER

Application filed April 1, 1929. Serial No. 351,740.

The invention relates to windshield wipers and has for its main object to so construct a wiper that when it is not in operation its wiper element is relieved from pressure whereby the wiper element may occupy substantially its normal position free from distortion. Another object is to provide means for engaging the windshield when the wiper is not in operation and carrying substantially all of the pressure which would otherwise be carried by the wiper element. A further object is to construct the wiper with a pair of spaced wiper elements which are alternately engageable with the windshield during operation of the wiper and upon movements thereof in opposite directions. With these as well as other objects in view, the invention resides in the novel features of construction and combinations and arrangements of parts as more fully hereinafter set forth.

In the drawing:—

Figure 1 is a front elevation of a windshield wiper embodying my invention and applied to a windshield;

Figures 2 and 3 are cross sections respectively on the lines 2—2 and 3—3 of Figure 1;

Figure 4 is a side elevation, partly broken away of a modified windshield wiper;

Figure 5 is a cross section on the line 5—5 of Figure 4.

The windshield wiper embodying my invention has, as shown, the pair of spaced substantially parallel flexible wiper elements or blades 1 and 2 formed of rubber or a rubber composition. These wiper elements or blades are secured in the spaced substantially parallel channels 3 of the body or holder 4, which is preferably a one-piece metal strip. These channels open in the same direction and the body has between the channels the oppositely opening channel 5.

For reciprocating the wiper, I have struck up from the web of the channel 5 the ears 6, which are apertured to receive the wiper arm 7, which is in the nature of a resilient rod exerting pressure upon the wiper to force the wiper elements or blades against the windshield. For the purpose of providing for difference in angularity of the arm and the body, one of the ears 6 is formed with a longitudinally extending opening which is transverse to the web of the channel 5. The arm has the transverse end portion 8 which is adapted to engage the sides of the channel 5 to limit angular movement of the body and wiper elements or blades relative to the arm. The connection between the arm and the body is such that the body tilts about the arm in opposite directions upon movements of the arm in opposite directions. In other words, the arrangement is such that during the operation of the wiper and upon movement thereof toward the left, as shown in Figure 1, the wiper element or blade 1 engages the windshield and upon movement in the opposite direction the wiper element or blade 2 engages the windshield, thereby greatly facilitating the securing of clear vision through the portion of the windshield being wiped.

For the purpose of relieving the wiper elements or blades from pressure exerted by the arm 7 when the wiper is not in operation, I have provided, in general, supporting means between the wiper elements or blades and engageable with the windshield when the wiper is at rest to carry substantially all of the pressure and thereby permit the wiper elements or blades to occupy substantially their normal positions free of distortion. In detail, the supporting means consists of the yieldable blocks 9, which are located at the ends of the body and have at their opposite sides the longitudinally extending grooves 10 for engagement with the flanges 11 formed upon the web of the channel 5 by cutting away the central portion of this web. These blocks are preferably formed of soft rubber and their edges 12 are preferably flat and located in substantially the same plane as the free edges of the wiper elements or the blades 1 and 2. With this arrangement the blocks assist in the tilting of the windshield wiper during its operation, but do not contact with the windshield while either of the wiper elements or blades is functioning to wipe the same. Upon stopping of the wiper it assumes a position at right angles to the windshield, both by reason of the location of the connection of the arm and the flexibility or resiliency of the wiper elements or blades and when in this position the blocks carry substantially all of the pressure exerted by the arm so that the wiper elements or blades are relieved from this pressure and will not become distorted.

In the modification shown in Figures 4 and 5, the actuating arm 13 corresponding to the arm 7 previously described is connected to the wiper body 14 by means of the pivotal member 15, which is preferably formed of a stamping. This pivotal member is in general U-shaped and extends within the channel 16 of the body and is pivotally connected thereto as by means of the pin 17. The ends of the web of this pivotal member are bent upwardly to form ears 18 and these ears are apertured to receive the arm 13. With this arrangement the arm may be secured directly to the pivotal member, the latter providing for variations in angular positions of the arm to the body.

It will be noted that with each of the constructions above described, the blocks 12 limit the flexure of the wiping strips 1 and 2 on opposite sides thereof and also limit the inward movement towards the windshield, so that the leading wiping strip is alone in contact and the trailing wiping strip is removed from contact with the glass. Upon reversal in direction, the block acts as a fulcrum, lifting the previous leading strip out of contact and contacting the previous trailing strip at a point spaced from the final position of the other strip. This effectually prevents the return of dirt wiped from the glass by movement in one direction which is a common defect with most windshield wipers.

What I claim as my invention is:

In a windshield wiper, the combination of an actuating arm, a wiping element, a pivotal connection between said actuating arm and wiping element, and means for limiting the rocking movement of said wiping element on said pivotal connection, said wiping element comprising two parallel flexible wiping strips spaced from each other, and blocks between the ends of the spaced wiping strips for limiting the inward movement and angular flexure thereof whereby at the limits of the rocking movement of said element the leading wiping strip has a limiting trailing angle wiping contact with the windshield in each direction of movement of said actuating arm and whereby the trailing wiping strip is removed from contact with the windshield and upon the reverse movement contacts in advance of the final position of the other strip.

In testimony whereof I affix my signature.

DON D. BRUSH.